Patented Sept. 9, 1924.

1,507,694

UNITED STATES PATENT OFFICE.

KARL STREITWOLF, OF HOCHST-ON-THE-MAIN, GERMANY, ASSIGNOR TO HERMANN A. METZ, OF NEW YORK, N. Y.

MANUFACTURE OF ARSENO COMPOUND OF THE PYRAZOLONE SERIES.

No Drawing.     Application filed October 23, 1920. Serial No. 419,158.

*To all whom it may concern:*

Be it known that I, KARL STREITWOLF, a citizen of Germany, residing at Hochst-on-the-Main, Germany, have invented certain new and useful Improvements in the Manufacture of Arseno Compounds of the Pyrazolone Series, of which the following is a specification.

We have found that arseno compounds which are derived from a 4-amino-2.3-dialkyl-1-aryl-5-pyrazolon and which contain in combined form in the 4-amino group a salt-forming acid atomic group such as —$CH_2COOH$, or —$CH_2OSOH$, possess eminently valuable properties because they are of slight toxicity and yet have a strong spirillocide action. They are applied in affections caused by spirilli in the form of their stable alkali salts which are readily soluble with neutral reaction and also keep well when dissolved.

The process for preparing the new compounds consists in introducing acid atomic groups into the arseno-di (4-amino-2.3-dialkyl-1-aryl-5-pyrazolone) by means of known reactions. They are yellow powders which are insoluble in water and alcohol, but readily soluble in diluted mineral acids and alkalies or alkali carbonates. When heated with acids they are decomposed.

A particular method of carrying out the process consists in causing aldehydesulfoxylates to act upon 4-nitroso- or 4-nitro-1-phenyl-2.3-dialkyl-5-pyrazolonarsinic acids instead of starting from a finished aminoarseno compound. When working after this method the transformation of the arsinic acid group into the arseno group, the reduction of the nitroso- or nitro group into the amino group and the introduction of the alkylenesulfoxyl residue into the amino group are effected in one single operation.

*Examples.*

1. 1-(phenyl-p-arsinic acid)-3-methyl-5-chloropyrazol: 207,5 gr. of 1-p-aminophenyl-3-methyl-5-chloropyrazol are dissolved in 1,5 litres of water while adding 200 ccm. of concentrated hydrochloric acid and this solution is diazotized by means of nitrite. The diazo solution thus obtained is treated in the known manner with an arsenite according to the processes described in German Patents Nos. 250264, 268172 or 254092. After acidifying the 1-(phenyl-p-arsinic acid)-3-methyl-5-chloropyrazol is precipitated. It can be recrystallized from spirit. When quickly heated it melts at about 192–195° C. with formation of anhydride. After elimination of the water it solidifies again. It decomposes completely only at a temperature above 290° C.

2. 1-(phenyl-p-arsinic acid)-3-methyl-5-pyrazolone: 217 gr. of arsanilic acid are diazotized in known manner and this diazo solution is introduced in a solution of 500 gr. of stannous chloride in 1000 ccm. of concentrated hydrochloric acid. To the solution thus obtained and which contains phenylhydrazinarsinic acid, are added all at once 156 gr. of acetoacetic ester and the whole is stirred for 12 hours. During the reaction some arsenopyrazolone separates which is removed by filtration.

The solution is then diluted with water until there is no further precipitation, and after filtration the precipitated tin double salt is washed with water. In order to free the latter from any tin it is dissolved in sodium carbonate while heating and from the filtered off solution the 1-(phenyl-p-arsinic acid)-3-methyl-5-pyrazolone is precipitated by acidification and the product thus obtained is filtered off, washed and dried. It is difficultly soluble in cold water, and can be recrystallized from hot water. It is readily soluble in alkalies, and forms a yellow nitroso compound.

3. 1-(phenyl-p-arsinic acid) 2.3-dimethyl-5-pyrazolone: 500 gr. of 1-(phenyl-p-arsinic acid)-3-methyl-5-chlorpyrazol are heated for 6 hours with 400 gr. of dimethyl sulfate to 120° C. The reaction mass is dissolved with 1 kg. of calcined sodium carbonate in 4 liters of water and this solution is heated for 12 hours to 95° C. The solution is then carefully acidified and the precipitated 1-(phenyl-p-arsinic acid)-2.3-dimethyl-5-pyrazolone is filtered off. It can be recrystallized from water and is readily soluble in diluted acids and alkalies.

The same compound can be produced from pyrazolone-arsinic acid (as per example 2) by methylation.

4. 4-nitroso-1-(phenyl-p-arsinic acid)-2.3-dimethyl-5-pyrazolone: 312 gr. of pyrazolonearsinic acid obtainable according to example 3 are dissolved in 1 liter of water with the calculated quantity of sodium carbonate. There are then added 70 gr. of sodium nitrite dissolved in 150 gr. of water and further added all at once the equivalent quantity (1 molecular proportion) of diluted sulfuric acid. The thus obtained bluish-green nitroso compound separates and can be filtered off. It is not stable and can be kept only for a short time.

5. Arseno compound from 4-nitroso-1-(phenyl-p-arsinic acid)-2.3-dimethyl-5-pyrazolone: 125 gr. of the nitroso compound obtainable according to example 4 are introduced while stirring into a solution of 1200 gr. of hydrosulfite, dissolved in 5000 liters of water. The solution thus obtained is heated for 2 hours to 60–65° C., the yellow precipitate is filtered off and washed with water. In order to obtain it in a pure state, the base thus obtained is dissolved in methyl alcohol and hydrochloric acid and from the solution the hydrochlorate is precipitated with ether. It forms yellow crystals which are readily soluble in methyl alcohol and water.

6. p-arseno-di (1-phenyl-2.3-dimethyl-4-amino-5-pyrazolone) monoacetic acid: 12,54 gr. of chloride of p-arseno-di (1-phenyl-4-amino-2.3-dimethyl-5-pyrazolone) are dissolved in 100 ccm. of water, neutralized with caustic soda lye of 15% strength and there are then added 14 gr. of bromacetic acid, dissolved in 30 gr. of water. The whole is heated for a short time to about 60° C. diluted with water and a solution of sodium carbonate added thereto. The undissolved portion is filtered off and the glycine-arseno compound is precipitated from the solution by means of acetic acid. It constitutes a yellowish powder, difficultly soluble in water and insoluble in alcohol. It dissolves in hydrochloric acid, caustic soda lye and sodium carbonate and forms readily-soluble yellow alkali salts.

If in this example a larger excess of bromacetic acid is used, the diglycine which is similar to the monoglycine, is obtained.

7. p-arseno-di (1-phenyl-2.3-dimethyl-4-amino-5-pyrazolone) monomethylenesulfoxylic acid: 95 gr. of chloride of p-arseno-di-(1-phenyl-2.3-dimethyl-4-amino-5-pyrazolone) are dissolved in 250 ccm. of methyl alcohol and 100 ccm. of water and to this solution are added 38 gr. of formaldehydesulfoxylate, dissolved in 100 ccm. of water. The whole is stirred for a quarter of an hour and there are then added a sodium carbonate solution and water until the mixture is almost entirely dissolved. The solution is then filtered and the arsenosulfoxylic acid is carefully precipitated by adding dilute hydrochloric acid. It forms a yellowish powder, difficultly soluble in water and insoluble in alcohol, but which dissolves in hydrochloric acid, caustic soda lye and sodium carbonate forming readily-soluble yellow alkali salts.

When using a larger excess of formaldehydesulfoxylate in this example, the dimethylenesulfoxylic acid is produced.

8. 15.6 gr. of 1-(phenyl-p-arsinic acid)-2.3-dimethyl-5-pyrazolone are dissolved with 50 ccm. of normal caustic soda lye and mixed with 3,5 gr. of sodium nitrite in 10 ccm. of water. There are then added 50 cc. of $\frac{2n}{1}$ hydrochloric acid. As soon as the nitroso compound has become entirely crystallized, 80 gr. of formaldehydesulfoxylate dissolved in 150 ccm. of water are added. Thus a clear yellow solution is produced which, on addition of 25 ccm. of $\frac{2n}{1}$ hydrochloric acid, is heated for a short time on the water bath. After precipitation there is immediately added some ice whereupon the isolated sulfoxylic acid is filtered off and well washed. It forms a yellow powder which is soluble in alkalies and strong acid.

Having now described my invention, what I claim is:

1. As a new process, the preparation of new arseno compounds of the pyrazolone series, which consists in introducing acid atomic groups into the amino group of the arseno-di (1-aryl-2.3-dialkyl-4-amino-5-pyrazolone).

2. As a new process, the preparation of new arseno compounds of the pyrazolone series, which comprises reacting upon a p-arseno-di-(1-phenyl-4-amino-2.3-dimethyl-5-pyrazolone with a compound comprising a sulfoxyl residue.

3. As a new process, the preparation of new arseno compounds of the pyrazolone series which consists in effecting the introduction of the sulfoxyl group into the amino group simultaneously with the preparation of the arseno amino pyrazolones in one operation by causing aldehydesulfoxylate to act upon 4-nitroso- or 4-nitro-1-aryl-2.3-dialkyl-5-pyrazolone-arsinic acids.

4. As new products, the compounds of the arseno-di-(1-aryl-2.3-dialkyl-4-amino-5-pyrazolone) corresponding to the general formula:

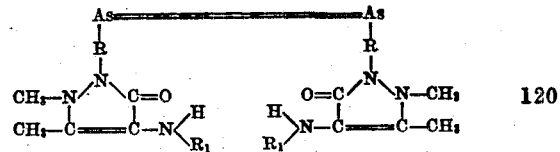

wherein R stands for an aryl residue and at least one $R_1$ represents an acid group, whilst the second $R_1$ may be a hydrogen atom; said compounds being, when crystallized, yellow crystalline powders and forming, when combined with alkalies, yellow alkali salts readily soluble in water.

5. As new products, the compounds of arseno-di-(1-aryl-2.3-dialkyl-4-amino-5-pyrazolones) containing a sulfoxyl group in at least one of the amino groups of a pyrazolone residue, being, when crystallized, yellow crystalline powders which form, when combined with alkalies, yellow alkali salts which are readily soluble in water.

6. As a new product, the compound of the 1-arseno-di-(1-phenyl-2.3-dimethyl-4-amino-5-pyrazolone) containing in each of the amino groups of the pyrazolone residues a sulfoxyl group and which, when crystallized, constitutes a yellow crystalline powder forming, when combined with alkalies, yellow alkali salts readily soluble in water.

In testimony whereof, I affix my signature.

Dr. KARL STREITWOLF.